(12) United States Patent
Yang

(10) Patent No.: US 7,756,150 B2
(45) Date of Patent: Jul. 13, 2010

(54) COMMUNICATION METHOD FOR MULTI-MODE WIRELESS TERMINAL

(75) Inventor: Ho Yang, Yongin-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 885 days.

(21) Appl. No.: 11/503,288

(22) Filed: Aug. 11, 2006

(65) Prior Publication Data
US 2007/0189317 A1   Aug. 16, 2007

(30) Foreign Application Priority Data
Feb. 14, 2006   (KR)   ...................... 10-2006-0014187

(51) Int. Cl.
*H04L 12/28* (2006.01)
(52) U.S. Cl. .................................................. 370/420
(58) Field of Classification Search ................. 370/229, 370/420, 310, 311, 347, 230, 254
See application file for complete search history.

(56) References Cited

U.S. PATENT DOCUMENTS 7,324,429 B2 *   1/2008   Walton et al. ............... 370/203

\* cited by examiner

*Primary Examiner*—Hanh Nguyen
*Assistant Examiner*—Anh Ngoc Nguyen
(74) *Attorney, Agent, or Firm*—NSIP Law

(57) ABSTRACT

Provided is a receiving method for a terminal supporting at least two communication modes and at least one receiving algorithms. The receiving method includes the terminal recognizing at least one current communication mode and a channel status, selecting a receiving algorithm for each active communication mode according to the channel status by referring to a previously designed algorithm lookup table, and receiving a signal of each active communication mode using the selected receiving algorithm. In the receiving method, by activating a combination of optimal receiving algorithms with computational complexity allowed by a system according to at least one active communication mode of a terminal and a channel status, multiple services can be efficiently provided.

18 Claims, 1 Drawing Sheet

COMMUNICATION METHOD FOR MULTI-MODE WIRELESS TERMINAL

PRIORITY

This application claims priority under 35 U.S.C. §119 to an application entitled "Communication Method for Multi-Mode Wireless Terminal" filed in the Korean Intellectual Property Office on Feb. 14, 2006 and assigned Serial No. 2006-14187, the contents of which are incorporated herein by reference.

BACKGROUND OF THE INVENTION

1. Field of the Invention

The present invention relates generally to wireless communication, and in particular, to a receiving method for a multi-mode wireless terminal, in which a signal is processed with a communication algorithm that is selected for each communication mode according to an active communication mode and a channel status.

2. Description of the Related Art

In a communication system, a communication algorithm is generally designed to guarantee minimum required performance based on economic efficiency according to standardization specifications. When the communication system is designed based on economic efficiency, a complicated solution cannot be supported and required performance cannot be achieved in a poor channel environment. Alternatively, when the communication system is designed to exhibit maximum performance using given hardware resources, the resources can be wasted in a good channel environment.

In order to solve the problem in algorithm design, a link adaptation mechanism provides certain flexibility for resource management by adaptively changing variables of an algorithm adaptively according to conditions of the channel environment. In a Multiple-Input Multiple-Output (MIMO) method or channel encoding method that is being actively studied, a plurality of algorithms are defined and are adaptively applied according to a channel status.

However, in a conventional communication system based on a plurality of algorithms neither hardware resources and neither complexity nor simultaneous implementation of multiple standard communication modes are considered in algorithm selection.

SUMMARY OF THE INVENTION

It is, therefore, an object of the present invention to provide a receiving method in which various services can be simultaneously provided by operating multiple algorithms based on hardware resources, user's demands, and a channel environment.

It is another object of the present invention to provide a communication method in which maximum performance can be provided within computation complexity allowed by a system by loading at least one communication algorithm according to an active communication mode and a channel status of a terminal.

According to an aspect of the present invention, there is provided a receiving method for a terminal supporting at least two communication modes and at least one receiving algorithm. The receiving method includes the terminal recognizing at least one active communication mode and a channel status, selecting a receiving algorithm for each active communication mode according to the channel status by referring to a previously designed algorithm lookup table, and receiving a signal of each active communication mode using the selected receiving algorithm.

Preferably, a sum of computational complexities of the selected receiving algorithms is less than a predetermined computational complexity allowed by the terminal.

Preferably, the computational complexity of the selected receiving algorithm increases proportionally to performance.

Preferably, the channel status is classified into good and poor according to a threshold value of a predetermined channel status parameter.

Preferably, selecting the receiving algorithm further includes selecting a receiving mode having highest performance from among receiving modes applicable to the active communication mode, if the number of active communication modes is equal to 1.

Preferably, selecting the receiving algorithm still further includes, if the number of active communication modes is greater than 2, determining priorities between the active communication modes, and selecting a receiving algorithm for each of the active communication modes, starting from a certain communication mode having the highest priority.

Preferably, selecting the receiving algorithm yet still further includes selecting a receiving algorithm having high performance, starting from a certain communication mode having the highest priority, if the channel status is poor.

Preferably, selecting the receiving algorithm yet still further includes selecting a receiving algorithm having low computational complexity, starting from a certain communication mode having the highest priority, if the channel status is good.

Preferably, selecting the receiving algorithm further includes selecting a receiving algorithm using a larger number of receiving antennas from among receiving algorithms having the same computational complexity.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
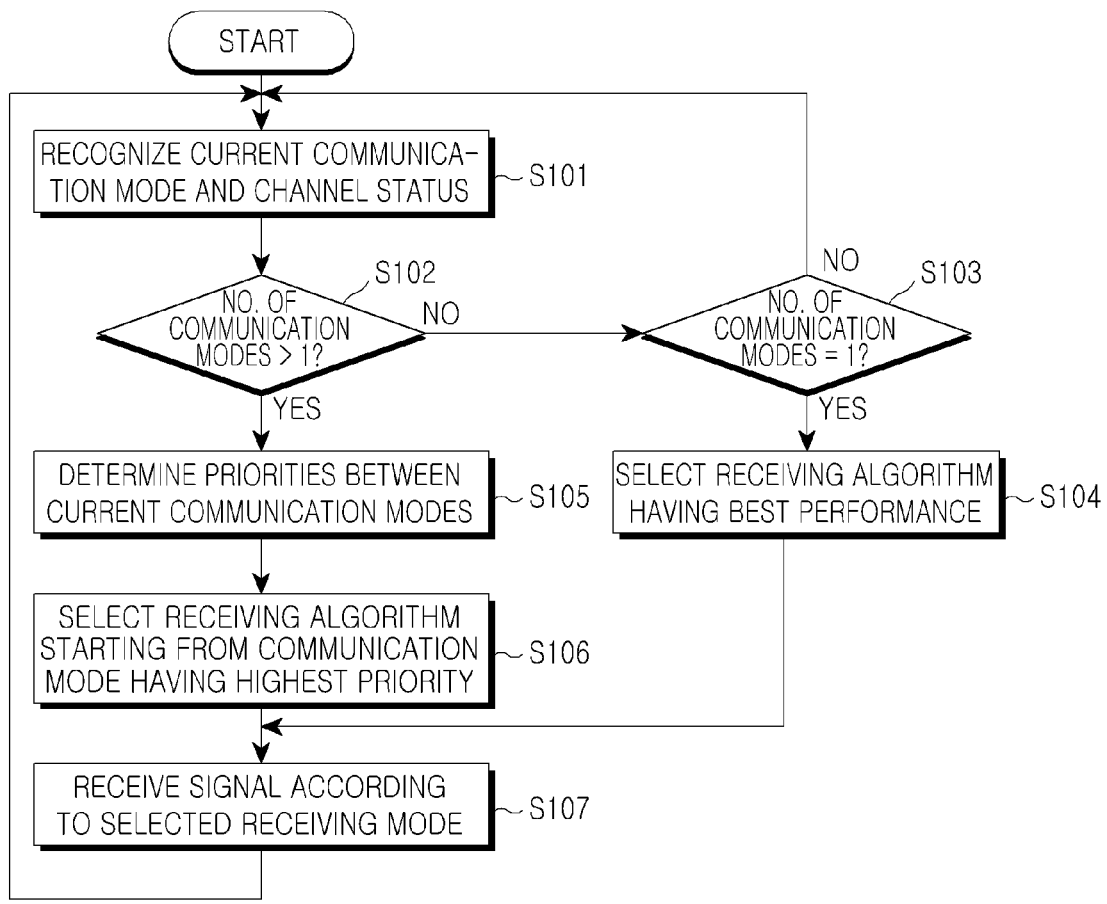
FIG. 1 is a flowchart illustrating a receiving method according to the present invention.

A preferred embodiment of the present invention will now be described in detail with reference to the annexed drawings. In the following description, well-known functions or constructions are not described in detail since they would obscure the invention in unnecessary detail.

Table 1 shows signal detection algorithms to be applied to a receiving method according to the present invention.

TABLE 1

|  | Complexity | Performance | Objective |
| --- | --- | --- | --- |
| MMSE | Middle | Middle | Good channel status, Single-operation mode having low priority |
| SIC | High | Good | Multi-operation mode having high priority, Basic mode |
| MLD | Very high | Very good | Very poor channel status, Single-operation mode |

In the present invention, a Minimum Mean Square Error (MMSE) algorithm having middle complexity and performance, a Successive Interference Cancellation (SIC) algorithm having high complexity and good performance, and a Maximum Likelihood Detection (MLD) algorithm having very high complexity and very good performance are taken as examples of a receiving algorithm, but other algorithms known in a communication field can also be used.

In order to select a receiving algorithm, consideration can be given of hardware resources, user's demands, performance requirements, and a channel environment. The hardware resources include the number of transmission/reception antennas, the computational capability of a modem processor, and the capacity of a battery. The user's demands include the type of a communication service (e.g., a cellular, a Wireless Local Area Network (WLAN), Wireless Metropolitan Area Network (WMAN), broadcasting), a transmission speed, and receipt performance. The performance requirements include a minimum Bit Error Rate (BER) or Packet Error Rate (PER), and maximum transmission power. The environment includes a channel status.

In the receiving method according to the present invention, a receiving algorithm is selected such that minimum hardware resources are used to reduce power consumption in a good communication environment and maximum hardware resources are used to achieve high performance in a poor communication environment. When at least two standards are simultaneously supported, a high-performance algorithm is selected to maintain high Quality of Service (QoS) for an important operation mode.

FIG. 1 is a flowchart illustrating a receiving method according to the present invention. A terminal first recognizes an active communication mode and a channel status in step S101 and determines whether the number of active communication modes is greater than 1 in step S102. If the number of active communication modes is not greater than 1, the terminal determines whether the number of active communication modes is equal to 1 in step S103. If so, the terminal selects a receiving algorithm having best performance from among receiving algorithms that are applicable to the active communication mode in step S104 and receives a signal according to the selected receiving algorithm in step S107.

If the number of active communication modes is greater than 1, the terminal determines priorities between the active communication modes in step S105 and sequentially selects receiving algorithms for the active communication modes, starting from a certain communication mode having the highest priority, in step S106. Once the receiving algorithm is selected for each of the current communication modes, a signal is received according to the selected receiving algorithm in step S107.

Upon being turned on, the terminal of the present invention checks a communication service mode, hardware resources, software resources, and performance and determines its operation mode. After determination of the operation mode, the terminal activates an algorithm lookup table that is based on design time information. If the algorithm lookup table is activated, the terminal initializes a default service mode with default hardware/software resources and performance and selects a receiving algorithm to be used from the algorithm lookup table based on execution time information. Upon selection of the receiving algorithm, the terminal actuates a single- or multi-standard transceiver, monitors a change in execution time parameters, and if there is a change, re-selects the receiving algorithm.

For a multi-mode wireless terminal requiring high performance, a receiving algorithm is designed to have highest complexity that is lower than maximum complexity allowed by hardware, as expressed in Equation (1) below:

$$\max_{kj} \sum_{j} \text{complexity}(module_{kj}, par_{1j}, par_{2j}, \ldots, par_{Nj}) \quad (1)$$

$$\text{subject to} \sum_{j} \text{complexity}() < \eta_T,$$

wherein k and j indicate a software module index and a service mode index, respectively, and $\eta_T$ indicates the maximum complexity allowed by hardware. The software modules are assumed to run overlapped in a given time interval of complexity calculation. The $par_{ij}$ denotes a parameter that affects the complexity of $module_{kj}$.

For a multi-mode wireless terminal requiring efficient power management, a receiving algorithm is designed to have lowest complexity that guarantees minimum performance required for communications, as expressed in Equation (2) below:

$$\min_{kj} \sum_{j} \text{complexity}(module_{kj}, par_{1j}, par_{2j}, \ldots, par_{Nj}) \quad (2)$$

$$\text{subject to} \sum_{j} \text{performance}() > \xi_T$$

wherein k and j indicate a software module index and a service mode index, respectively, and $\xi_T$ indicates the minimum performance required for communication. The software modules are assumed to run overlapped in a given time interval of complexity calculation. The $par_{ij}$ denotes a parameter that affects the complexity of $module_{kj}$.

In the receiving method according to the present invention, parameters and restrictions for selecting a receiving algorithm are defined as follows.

Parameter 1: Service mode (e.g., the service mode includes a single mode and a multi-mode including ordered WLAN, WMAN, and digital broadcasting. There exist 15 choices for three (3) service modes.)

Parameter 2: The number of antennas (e.g., 1, 2, 3, 4)

Parameter 3: Module type (data rate or reliability: Type_$A_1$, Type_$A_2$, Type_$A_3$, Type_$B_1$, Type_$B_2$, Type_$B_3$)

Parameter 4: Channel status (poor, good, very good)

Restriction 1: The maximum number of antennas=2

Restriction 2: There is no priority between second and third service modes

In the receiving method according to the present invention, if the optimization issue is determined according to restrictions for selecting the optimal receiving algorithm, the algorithm lookup table is designed based on design time parameter information and the optimal receiving algorithm is selected based on execution time parameter information.

The channel status is a typical execution time parameter and other design time parameters can be used if necessary. The parameters described above can be simplified by additional restrictions and assumptions.

Many parameters can be used to select the optimal receiving algorithm and the size of the parameters should be reduced within a range that can be treated in the optimization process. Table 2 shows computational complexity corresponding to the number of antennas and a receiving algorithm for each communication system, where the complexity number is conceptually simplified for easy explanation.

TABLE 2

| Standard | | WLAN | | WMAN | | Broadcasting |
|---|---|---|---|---|---|---|
| The number of antennas | | 1 | 2 | 1 | 2 | 1 |
| Algorithm | MMSE | 1 | 3 | 1 | 3 | 1 |
| | SIC | 2 | 4 | 2 | 4 | 2 |
| | MLD | 3 | 5 | 3 | N/A | N/A |

Table 3 is an algorithm lookup table showing complexities for twelve (12) service modes with two (2) channel conditions at most based on computational complexity of Table 2. The maximum complexity is assumed to be 6.

In the present invention, when at least two communication service modes operate simultaneously, the first service mode has higher priority than the other receiving mode and higher priority is given to a multi-antenna method under the same complexity.

TABLE 3

| | Poor channel status | | Good channel status | |
|---|---|---|---|---|
| Service mode | Algorithm | Complexity | Algorithm | Complexity |
| WLAN | MLD (2) | 5 | MLD (2) | 5 |
| WMAN | SIC (2) | 4 | SIC (2) | 4 |
| Broadcasting | SIC (1) | 2 | SIC (1) | 2 |
| WLAN + WMAN | MLD (2) + MMSE (1) | 6 | MMSE (2) + MMSE (2) | 6 |
| WLAN + Broadcasting | MLD (2) + MMSE (1) | 6 | SIC (2) + SIC (1) | 6 |
| WMAN + WLAN | SIC (2) + SIC (1) | 6 | MMSE (2) + MMSE (2) | 6 |
| WMAN + Broadcasting | SIC (2) + SIC (1) | 6 | SIC (2) + SIC (1) | 6 |
| Broadcasting + WLAN | SIC (1) + SIC (2) | 6 | SIC (1) + SIC (2) | 6 |
| Broadcasting + WMAN | SIC (1) + SIC (2) | 6 | SIC (1) + SIC (2) | 6 |
| WLAN + (WMAN, Broadcasting) | SIC (2) + MMSE (1) + MMSE (1) | 6 | MMSE (2) + SIC (1) + MMSE (1) | 6 |
| WMAN + (WLAN, Broadcasting) | SIC (2) + MMSE (1) + MMSE (1) | 6 | MMSE (2) + SIC (1) + MMSE (1) | 6 |
| Broadcasting + (WLAN, WMAN) | SIC (1) + SIC (1) + SIC (1) | 6 | SIC (1) + SIC (1) + SIC (1) | 6 |

In Table 3, when the first service mode is a WLAN and the second service mode is a WMAN in poor channel status, an MLD algorithm using two antennas is selected for the WLAN and an MMSE algorithm using one antenna is selected for the WMAN. Whether in the same service mode, a receiving algorithm changes according to channel status while maintaining complexity.

As described above, according to the present invention, multiple receiving algorithms can be selectively or simultaneously used based on user's demands and an environment, thereby providing various services in a desired form. Moreover, by activating a combination of optimal receiving algorithms with computational complexity allowed by a system according to at least one active communication mode of a terminal and a channel status, multiple services can be efficiently provided.

While the present invention has been shown and described with reference to a preferred embodiment thereof, it will be understood by those skilled in the art that various changes in form and details may be made therein without departing from the spirit and scope of the invention.

What is claimed is:

1. A receiving method for a terminal supporting at least two communication modes and at least one receiving algorithm, the receiving method comprising:

recognizing the terminal at eas one active communication mode and a channel status;

selecting, by the terminal a receiving algorithm for the recognized at least one active communication mode according to the channel status by referring to a previously designed algorithm look table; and receiving, by the terminal, a signal of the recognize at east one active communication mode using the selected receiving algorithm, wherein the at least one active communication mode is at least one communication service mode provided in the terminal, and the at least one communication service mode includes at leas one from among a wireless local area network (WLAN), a wireless metropolitan area network (WMAN), and a broadcasting mode, and wherein a sum of computational complexities of the selected receiving algorithms is maximized while being constrained to be less than a predetermined computational complexity allowed by the terminal if high performance is top priority.

2. A receiving method for a terminal supporting at least two communication modes and at least one receiving algorithm, the receiving method comprising:

recognizing, by the terminal, a east one active communication mode and a channel status;

selecting, by the terminal, a receiving algorithm for the recognized at least one active communication mode according to the channel status by referring to a previously designed algorithm lookup table; and receiving, by the terminal, a signal of the recognized at least one active communication mode using the selected receiving algorithm, wherein the at least one active communication mode is at least one communication service mode provided in the terminal, and the at least one communication service mode includes at least one from among wireless local area network (WLAN), a wireless metropolitan area network (WMAN), and a broadcasting mode, and wherein a sum of computational complexities of the selected receiving algorithms is minimized while a sum of performance is constrained to be greater than a predetermined performance required by the services if low power is top priority.

3. The receiving method of claim 1, wherein the computational complexity of the selected receiving algorithm increases proportionally to performance.

4. The receiving method of claim 2, wherein the computational complexity of the selected receiving algorithm increases proportionally to performance.

5. The receiving method of claim 3, wherein the channel status is classified into good and poor according to a threshold value of a predetermined channel status parameter.

6. The receiving method of claim 4, wherein the channel status is classified into good and poor according to a threshold value of a predetermined channel status parameter.

7. The receiving method of claim 3, wherein the step of selecting, by the terminal, the receiving algorithm comprises selecting by the terminal, a receiving mode having highest performance from among receiving modes applicable to the active communication mode, if the number of active communication modes is equal to 1.

8. The receiving method of claim 4, wherein the step of selecting, by the terminal, the receiving algorithm comprises selecting a receiving mode having highest performance from among receiving modes applicable to the active communication mode, if the number of active communication modes is equal to 1.

9. The receiving method of claim 3, wherein the step of selecting, by the terminal, the receiving algorithm comprises:
if the number of active communication modes is greater than 2, determining, by the terminal, priorities between the current communication modes; and
selecting, by the terminal, a receiving algorithm for each of the active communication modes, starting from a certain communication mode having the highest priority.

10. The receiving method of claim 4, wherein the step of selecting, by the terminal, the receiving algorithm comprises:
if the number of active communication modes is greater than 2, determining, by the terminal, priorities between the current communication modes; and
selecting, by the terminal, a receiving algorithm for each of the active communication modes, starting from a certain communication mode having the highest priority.

11. The receiving method of claim 9, wherein the step of selecting, by the terminal, the receiving algorithm comprises selecting a receiving algorithm having high performance, starting from a certain communication mode having the highest priority, if the channel status is poor.

12. The receiving method of claim 10, wherein the step of selecting, by the terminal, the receiving algorithm comprises selecting a receiving algorithm having high performance, starting from a certain communication mode having the highest priority, if the channel status is poor.

13. The receiving method of claim 9, wherein the step of selecting, by the terminal, the receiving algorithm comprises selecting a receiving algorithm having low computational complexity, starting from a certain communication mode having the highest priority, if the channel status is good.

14. The receiving method of claim 10, wherein the step of selecting, by the terminal, the receiving algorithm comprises selecting a receiving algorithm having low computational complexity, starting from a certain communication mode having the highest priority, if the channel status is good.

15. The receiving method of claim 13, wherein the step of selecting, by the terminal, the receiving algorithm comprises selecting a receiving algorithm using a larger number of receiving antennas from among receiving algorithms having the same computational complexity.

16. The receiving method of claim 14, wherein the step of selecting, by the terminal, the receiving algorithm comprises selecting a receiving algorithm using a larger number of receiving antennas from among receiving algorithms having the same computational complexity.

17. A receiving method for a terminal supporting at least two communication modes and at least one receiving algorithm, the receiving method comprising:
recognizing, by the terminal, at least one active communication mode and a channel status;
selecting, by the terminal, a receiving algorithm for the recognized at least one active communication mode according to the channel status by referring to a previously designed algorithm lookup table; and
receiving, by the terminal, a signal of the recognized at least one active communication mode using the selected receiving algorithm,
wherein a sum of computational complexities of the selected receiving algorithms is maximized while being constrained to be less than a predetermined computational complexity allowed by the terminal if high performance is a priority.

18. A receiving method for a terminal supporting at least two communication modes and at least one receiving algorithm, the receiving method comprising:
recognizing, by the terminal, at least one active communication mode and a channel status;
selecting, by the terminal, a receiving algorithm for the recognized at least one active communication mode according to the channel status by referring to a previously designed algorithm lookup table; and
receiving, by the terminal, a signal of the recognized at least one active communication mode using the selected receiving algorithm,
wherein a sum of computational complexities of the selected receiving algorithms is minimized while a sum of performance is constrained to be greater than a predetermined performance required by the services if low power is a priority.

* * * * *